Oct. 29, 1963
E. R. RETAILLIAU
3,108,972
REMOVING IMPURITIES FROM CATALYSTS
Filed Jan. 13, 1960
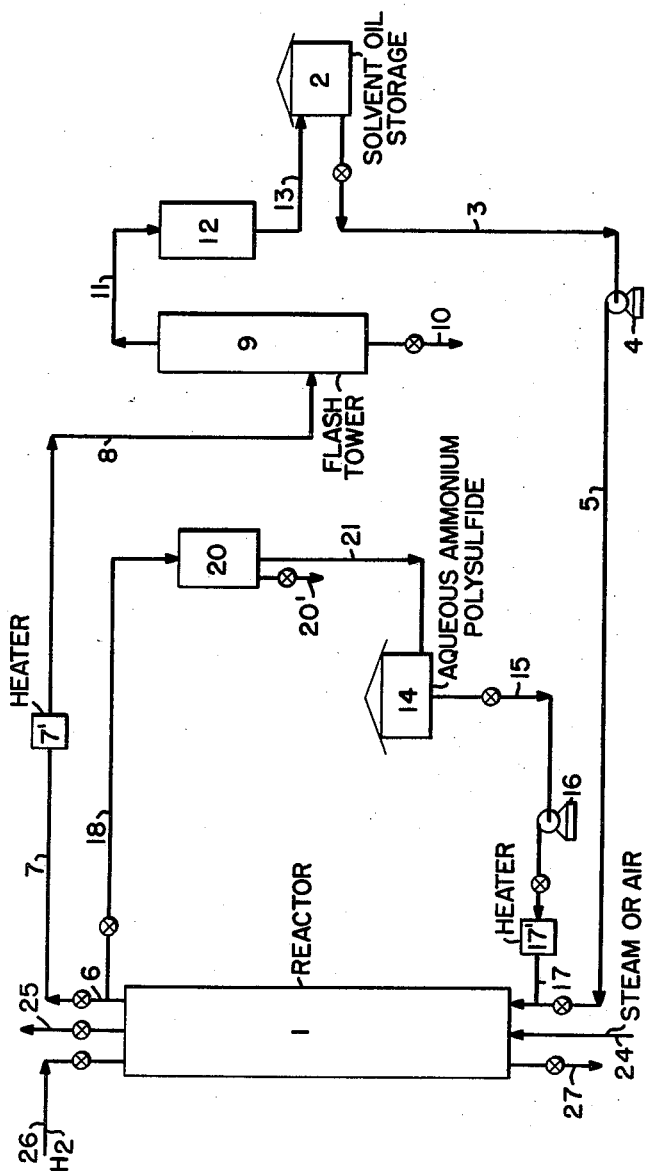
Edmond R. Retailliau   Inventor
By *George J. Silhavy*
Patent Attorney

United States Patent Office 3,108,972
Patented Oct. 29, 1963

3,108,972
REMOVING IMPURITIES FROM CATALYSTS
Edmond R. Retailliau, Cranford, N.J., assignor to Esso Research and Engineering Company, a corporation of Delaware
Filed Jan. 13, 1960, Ser. No. 2,194
19 Claims. (Cl. 252—412)

The present invention relates to improvements in removing impurities from solid catalytic materials. More particularly, the present invention relates to removing from a catalyst mineral contaminants deposited on the catalyst during use in the treatment of a hydrocarbon oil. Oil soluble forms of vanadium, iron and nickel are present in many crude petroleum oils and even though present in small amounts, nevertheless during continued contact with such oils at reaction temperatures the catalyst, during treatment of such oils acquires deactivating metallic deposits by the decomposition of oil soluble compounds of heavy metals.

Many heavy residual oils also contain sulfur, and in order to remove this sulfur from the residual oils, they are commonly subjected to hydrodesulfurization in the presence of hydrogen and a catalyst. A commonly used catalyst for this purpose is cobalt molybdate carried on an active form of alumina. These operations are normally carried out at elevated temperatures and pressures. Since, in many instances, as pointed out above the oil subjected to such treatment also contains vanadium, iron, nickel and other mineral constituents, the catalyst, upon continued use, becomes contaminated with these mineral constituents and its activity is impaired. At the same time the catalyst also acquires carbonaceous deposits and these also eventually cause the catalyst to lose activity.

In catalytic cracking, some gas oil feeds contain vanadium, nickel, iron compounds and the like which are deposited on the catalyst during the cracking step and form contaminating metallic deposits on the catalysts. These contaminants are not removed by regeneration and accumulate on the catalyst. These contaminating metallic materials reduce the activity and selectivity of the catalysts in cracking and form more hydrocarbon gas and hydrogen and coke from the feed than non-contaminated cracking catalysts. The problem of removing these contaminants from cracking catalysts has long been a problem in catalytic cracking. In one method of overcoming this problem, part of the regenerated catalyst must be continuously discarded and replaced by fresh catalyst in order to maintain the desired level of cracking activity.

It has now been found that cracking catalysts contaminated with vanadium, nickel, iron compounds and the like can be reactivated by treatment with aqueous ammonium sulfide or ammonium polysulfide solutions.

The catalyst and sulfide solution are stirred or subjected to ultrasonic mixing. In addition the catalyst before treatment with the sulfide solution may be treated with a solvent to remove hydrocarbonaceous deposits.

In brief compass, the present invention provides a means of treating a mineral-contaminated solid catalyst which has been contaminated with metallic substances such as vanadium, iron, nickel compounds, during use in treating a hydrocarbon oil. It has been found that ammonium sulfide $(NH_4)_2S$ and ammonium polysulfide $(NH_4)_2S_x$ are useful for converting the contaminating metallic constituents on the catalyst into complexes which are water soluble or soluble in the sulfide solutions and removable without removing the metal or metals which are the active components of the catalyst.

In carrying out one form of the present invention, the fouled catalyst is washed in situ first with a hydrocarbon-containing solvent or other suitable solvent or wash oil following the on-stream period to remove adhering processed oil. Following the washing of the catalyst, the next step is to remove the wash oil or solvent by use of steam or a volatile aromatic oil. The catalyst is then treated with an aqueous solution of ammonium sulfide or ammonium polysulfide, whereby substantial amounts of the contaminating metals or minerals are removed. The catalyst is then water washed to recover the ammonium sulfide or polysulfide for re-use in the process.

The next step in the process is to remove the carbon also formed on the catalyst by treating the catalyst with a regeneration gas such as air or diluted air whereupon the carbon or carbonaceous deposits are burned from the catalyst. The catalyst may then be treated a second time with an aqueous solution of ammonium sulfide or ammonium polysulfide. The ammonium polysulfide $$(NH_4)_2S_x$$

solution is preferred.

In some cases, it is desirable in treating the contaminated catalyst first to subject it to the influence of hydrogen whereupon the carbonaceous material on the catalyst is converted, at least in part, to gasiform material removable overhead from the catalyst. The catalyst is then washed with an aromatic extract such as obtained in the treatment of kerosene with liquid $SO_2$, steamed to remove the aromatic extract, then treated with an aqueous solution of ammonium sulfide, ammonium polysulfide and finally water washed.

Another good way to proceed is first to treat the catalyst after the on-stream phase following a wash to remove adhering oil, with an oxidative regeneration gas such as air to burn off the carbonaceous material whereupon the catalyst is treated with a aqueous solution of ammonium polysulfide or ammonium sulfide and water washed. For treating contaminated cracking catalysts, the catalyst is first preferably regenerated with air to remove carbonaceous deposits and is then treated with an aqueous ammonium polysulfide or ammonium sulfide solution.

The object of the invention is to remove contaminating metallic deposits from a supported or unsupported solid catalytic material which has become deactivated by use in a catlaytic process due to the deposition thereon of said metallic materials.

A more specific object of the present invention is to provide an economical method of restoring the activity of a catalyst which has become deactivated during use in treating a hydrocarbon oil, due to the deposition thereon of metallic constituents contained in said oil.

Another object of the present invention is to remove from a hydrogenating catalyst comprising a hydrogenation-dehydrogenation component supported on a carrier such as alumina, metallic constituents acquired by the catalyst during use in treatment of a hydrocarbon oil, without however, removing any substantial amount of the said hydrogenation-dehydrogenation component or the alumina carrier.

Another object of the present invention is to remove contaminating metallic deposits from cracking catalysts such as silica-alumina without removing any substantial amount of the catalyst.

Other and further objects of the present invention will appear in the following detailed description and claims.

The accompanying drawing illustrates diagrammatically an apparatus layout in which one modification of the present invention may be carried into effect using a fixed catalyst bed.

Referring in detail to the drawing, 1 represents a reactor which contains a fixed bed of a hydrogenation catalyst which catalyst has become contaminated by metallic compounds present in a residual oil which had been subjected to hydrogenation to remove sulfur in said reactor. During hydrodesulfurization the temperature is maintained between about 650° F. and 850° F., preferably about 825° F., and a pressure between about 400 p.s.i.g. and 1600 p.s.i.g., preferably about 1200 p.s.i.g. During this operation, metals contained in the oil being treated, such as vanadium, nickel and iron have been deposited on the catalyst, and, furthermore, there has also been deposited on the catalyst, carbonaceous and sulfur containing material. The removal of the metallic and other contaminants from such spent catalyst is carried out, according to the present invention in the following manner.

As previously noted when the on-stream period is discontinued, the catalyst is first treated with a solvent or wash oil withdrawn from a feed tank 2 through line 3 and pump 4 and line 5 to the bottom of reactor 1 for upward passage therethrough. This solvent oil serves to remove oily material adsorbed on the catalyst. The solvent oil may be, for example, a virgin gas oil or an $SO_2$ extract of kerosene which extract is largely aromatic. An excellent solvent oil is one made of benzene, acetone and methanol as will be pointed out hereinafter. The solvent oil containing oil dissolved off the catalyst is withdrawn overhead from reactor 1 through line 6 and then passes successively through lines 7 and 8 and heater 7' to a flash tower 9. From the bottom of the flash tower 9, higher boiling oil freed from the solvent oil is withdrawn through line 10. The solvent oil is vaporized and withdrawn overhead through line 11 and conducted to a cooling zone 12 wherein the said oil is condensed and thereafter returned by line 13 to solvent feed tank 2 for further use in the process.

Any solvent oil remaining in reactor 1 is removed by steam stripping, condensing, and separating the solvent from the water in any conventional manner.

Following removal of the solvent oil from reactor 1 a water solution of ammonium polysulfide or ammonium sulfide is fed from tank 14 via line 15 and pump 16 thence through line 17 and heater 17' into the bottom of reactor 1. The ammonium polysulfide solution serves to convert the contaminating metallic deposit on the catalyst such as a vanadium compound into complex vanadium sulfo compounds, such as ammonium sulfovanadates which are soluble in the ammonium polysulfide solution. The ammonium polysulfide solution passes upwardly through reactor 1 in removing the metallic contaminants from the catalyst and the solution is withdrawn overhead via line 18. This solution is then treated in any suitable conventional manner in a recovery system diagrammatically shown at 20 to separate the dissolved metallic sulfides and reconstitute the ammonium sulfide or polysulfide reagent for reuse in the process. The metallic impurities such as the vanadium and nickel sulfides as well as excess sulfur are recovered via withdrawal line 20'. Reconstituted ammonium sulfide or ammonium polysulfide reagent is returned to storage tank 14 via line 21.

The treatment with the ammonium polysulfide solution which is deeply colored red in the case where vanadium compounds are present may be discontinued when the deep red color no longer appears, and at this point the feeding of the ammonium polysulfide solution to reactor 1 is discontinued.

The ammonium polysulfide solution is then drained from the reactor, returned to storage tank 14, and steam from line 24 is passed upwardly through the catalyst bed to recover any ammonium polysulfide adsorbed on the catalyst surface. The steam and vaporized products are withdrawn overhead from reactor 1 and passed via line 18 to the recovery system 20.

If a hydrogen treat is used prior to the ammonium polysulfide treat, hydrogen at 500°–600° F. is passed from line 26 downwardly through reactor 1 and the resulting gasiform material removed via line 27.

Following the steaming of the catalyst to remove the ammonium polysulfide, the catalyst may then be treated with heated air or other oxidizing gas which is introduced to the present system through line 24 and then passed upwardly through the bed of catalyst in reactor 1 in order to remove by burning the carbonaceous deposits which are on the catalyst. The regeneration fumes are removed overhead through line 25. The regeneration of the catalyst to remove carbon in the manner indicated may be carried out at a temperature of the order of 600° F. to 1150° F., depending upon the type of catalyst to be treated or regenerated, lower temperatures in this range being used for cobalt molybdate catalysts and higher temperatures being used for cracking catalysts.

Following the regeneration of the catalyst to remove carbonaceous material, the catalyst may be again treated with an aqueous solution of ammonium polysulfide or ammonium sulfide to remove the contaminating metallic constituents which persist on the catalyst and which were encased in the carbonaceous deposits which prevented their extraction by the previous treatment with the ammonium polysulfide solution. This second treatment with the ammonium polysulfide solution is carried out in the same manner as the first treatment. Following this treatment the catalyst is ready for reuse.

The concentration of the aqueous ammonium sulfide solution to be used is between about 10% by weight of ammonium sulfide to a saturated solution of ammonium sulfide. To make an aqueous ammonium polysulfide solution, up to about 4% of elemental sulfur by weight on the ammonium sulfide in the solution is added to the solution. The weight ratio of either sulfide solution to solid catalyst is between about 3 and 150. The temperature of the treating step to remove metallic deposits is between about 75° F. and 500° F., preferably 250° F. to 400° F., and the pressure between about atmospheric and about 600 p.s.i.g. A pressure higher than atmospheric pressure is used at the higher temperatures to maintain the aqueous ammonium polysulfide solution in liquid form and to prevent decomposition of the ammonium polysulfide or ammonium sulfide at the higher temperatures. The time of treatment of the catalyst with the aqueous ammonium sulfide or polysulfide solution is between about 15 and 45 minutes.

In order to more fully describe the present invention, the following examples are set forth.

*Example 1*

A cobalt molybdate-alumina catalyst employed in the hydrodesulfurization of a 30% residuum from a Bachaquero crude which contained 44 parts per million of vanadium was subjected to a conventional hydrodesulfurization process under known conditions of operation. The catalyst was found to contain after 149 hours on-stream operation, 6.7 wt. percent of vanadium calculated as such, 13.3 wt. percent of carbon, and 5.5 wt. percent of sulfur. The catalyst was first washed at ambient temperature with an $SO_2$ extract of kerosene to remove adhering oil.

After treatment with an aqeuous solution of ammonium sulfide, containing 17.2% by weight of ammonium sulfide at a temperature of 400° F. and under a pressure of 400 p.s.i.g. in order to maintain the aqueous solution in the liquid state, the vanadium content was found to be 4.22%, representing therefore a 37% removal of the vanadium originally present on the catalyst without removing substantially any of the cobalt or molybdenum compounds of the original catalyst.

The treated catalyst was then regenerated with air and since a weight loss of 13% resulted from the removal of the carbonaceous material and the conversion of the metallic sulfides to the corresponding oxides, the vanadium content of the regenerated catalyst became 4.85%.

On further extraction of the regenerated catalyst with ammonium sulfide under the same conditions of temperature and pressure described above, a further removal of the vanadium amounting to 56% by weight was obtained, leaving only 2.14 weight percent of vanadium on the catalyst.

It is thus seen that this sequence of treatments did effect an overall removal of 74.7 weight percent of the vanadium contaminants present on the original fouled catalyst without removing any of the cobalt or molybdenum compounds of the original catalyst.

The foregoing example is merely illustrative of the invention and the same is not limited to the precise details enumerated therein. Good results are attainable in removing metals from a solid catalyst by operating at temperatures in the range of from about 100° F. to 500° F. and pressures of from about atmospheric to 600 p.s.i.g. during the treatment of the catalyst with aqueous ammonium polysulfide but preferably under pressure and at a temperature above about 160° F. The concentration of ammonium sulfide or polysulfide in water may vary from 10% by weight to a saturated solution of the sulfide. It is also pointed out that a plain water wash may be employed in place of the second treat with aqueous ammonium polysulfide where the object is to remove a vanadium compound from the catalyst.

However, it is preferred to operate in such a manner, in the case where the catalyst treated is cobalt molybdate carried on alumina, which has become contaminated with metals during use in hydrodesulfurization of a mineral oil, to cause sulfur to be present on the reactivated catalyst. The catalyst is more active when it is at least partially sulfurized especially for use in desulfurizing oils.

*Example 2*

In another example cobalt molybdate on alumina catalyst which had become contaminated by use in hydrodesulfurizing residual oil contained 5.9 wt. percent vanadium. The contaminated catalyst was not regenerated but was treated with $SO_2$ extract of kerosene at a temperature of about 570° F. and then treated with an ammonium sulfide solution at a temperature of about 350° F. and a pressure of about 300 p.s.i.g. The vanadium removed amounted to 37% by weight of the vanadium on the spent catalyst. There was a loss of about 1.0% by weight of catalyst.

*Example 3*

In another example contaminated spent cobalt molybdate on alumina unregenerated catalyst used for desulfurizing residual oil was first treated with $SO_2$ extract of kerosene and then at a temperature of about 350 F. and a pressure of about 300 p.s.i.g. with ammonium sulfide to remove about 37% by weight of the vanadium. Only about 2% molybdenum was lost from the catalyst.

The present process is also effective in removing vanadium, iron and nickel, etc. from contaminated hydrogenation, dehydrogenation, reforming, cracking and other solid catalysts.

*Example 4*

In another example an unregenerated hydrodesulfurization or hydrofining catalyst consisting of cobalt molybdate on alumina was used for hydrodesulfurizing Bachaquero residual oil in a slurry operation. After a period of operation the cobalt molybdate catalyst contained 1.2% by weight vanadium and 25% coke by weight.

Treatment of the cobalt molybdate catalyst with a triple organic solvent consisting of 70% benzene, 15% acetone, and 15% methanol was carried out using about 5 parts by weight of the triple solvent to one part by weight of the catalyst. The amount of the solvent can be varied between about 2 and 10 parts by weight to one part by weight of the catalyst. The mixing of catalyst and triple solvent was carried out in a glass flask for about 0.5 to 1.5 hours at room temperature and atmospheric pressure.

Then the solvent was removed and the treated catalyst was mixed with about 5 to 10 parts by weight of an aqueous solution of ammonium polysulfide containing about 26% by weight of ammonium polysulfide at room temperature and atmospheric pressure in a glass flask which was put in a laboratory magnetostrictive ultrasonic tank where (Bendix ultrasonic) the mixture was subjected to ultrasonic mixing. This ultrasonic mixing was maintained for about 20 minutes with a power input of about 150 watts per liter of solution and at a frequency of about 18 to 20 kilocycles per second. The amount of vanadium removed was about 75%.

The present invention is also useful in reactivating cracking catalysts which have become contaminated with metal compounds of vanadium, nickel, iron etc. when used in the catalytic cracking of oils such as gas oils containing metallic compounds. The cracking process may be one using catalyst in the form of cylinders or pills, beads or finely divided fluidizable catalyst. Any conventional cracking catalyst may be used such as, for example, silica-alumina catalyst.

Metallic contaminants in the catalytic cracking feed stock are laid down on the catalyst during the process and these metallic contaminants so depress the selectivity and activity of cracking catalysts that part of the deactivated catalyst is continuously or periodically replaced by fresh cracking catalyst to maintain satisfactory cracking activity. With the present invention the contaminating metals are removed or extracted from discarded cracking catalyst or highly contaminated catalyst to restore the catalysts to good cracking activity. The preferred material for use in removing contaminants from cracking catalysts is an aqueous solution of ammonium polysulfide having a concentration between about 20% by weight and 40% by weight. Ammonium polysulfide is made in one way by adding and dissolving elemental sulfur in an aqueous solution of ammonium sulfide, $[(NH_4)_2S]$. The temperature of treatment may be between about 100° F. and 400° F. and the pressure between about atmospheric and 400 p.s.i.g., the pressure being selected to be high enough to maintain the aqueous solution as a liquid. The amount of ammonium sulfide or polysulfide solution used is between about 10 and 100 parts by weight of the solution to one part by weight of catalyst.

It has been found that it is unnecessary to remove all the contaminants from the catalyst since those contaminants left after the ammonium sulfide or ammonium polysulfide treatment or extraction do not impair the catalytic properties of the treated catalyst. From the standpoint of contaminating metals removal, the improvement is higher than expected, showing that the contaminating metals left on the catalyst were not as detrimental as those removed or that the contaminating metals left on the catalyst were deactivated or passivated.

The metallic contaminants are presumably present in or on the catalyst either in the form of sulfides when cracking sulfur-bearing feedstocks before the catalyst is regenerated or of oxides after the catalyst is regenerated. The treatment of the present invention converts the water insoluble contaminating compounds into derivatives or other compounds which are removable by the aqueous ammonium sulfide or ammonium polysulfide solutions.

The catalyst used in the following examples was a silica-alumina cracking catalyst containing about 13% alumina and this catalyst was used to crack a West Texas residuum in a fluid pilot unit where the catalyst was regenerated in a regenerator and recycled to the reactor. The residuum had the following characteristics:

° API gravity ---------------------------------- 15.6
IBP, ° F -------------------------------------- 579
Con carbon ----------------------------------- 9.54

Because of the poor feed stock used the cracking catalyst was far more contaminated than the equilibrium catalyst from normal refinery operations. A comparison of the two types of catalysts follows:

| Catalyst (Pilot), wt. percent | Catalyst (Equilibrium), wt. percent | |
|---|---|---|
| | A | B |
| V ---------------- 0.272 | 0.002 | 0.230 |
| Ni --------------- 0.074 | 0.009 | 0.033 |
| Fe --------------- 0.201 | 0.100 | 0.207 |

Column A refers to equilibrium catalyst used for cracking oil feeds of low metal content.

In most of these experiments about 4 grams of the regenerated cracking catalyst were treated with the ammonium sulfide aqueous solution or the ammonium polysulfide aqueous solution in a ½ liter, 3-neck round bottom glass flask, equipped with a reflux condenser, a conventional mechanical rotary glass stirrer and an electric heating mantle. Following the treatment at the desired temperature for the specified time, the stirrer was stopped, the solution settled and decanted on a Büchner funnel.

The catalyst was washed and dried and the catalyst analyzed for the contaminating metals. All the experiments were carried out at atmospheric pressure and at a temperature within the range of 125° F. to 160° F. Higher pressures permit the use of higher temperatures which improves the removal of contaminating metals. The time of stirring was between about 15 and 45 minutes. Ultrasonic mixing was used also and this comprised immersing a glass flask containing the catalyst and sulfide solution in a commercial Bendix ultrasonic cleaning bath filled with water. The contacting time was 20 minutes at a frequency of about 21 kilocycles per second and the power input to the samples was about 150 watts per liter of solution.

The following results were obtained in a series of tests.

| Agent and Temperature | Mixing | Wt. Percent Metals Removal | | |
|---|---|---|---|---|
| | | V | Ni | Fe |
| Ammonium Sulfide (NH$_4$)$_2$S—160° F | Rotary | 64 | 24 | 10 |
| Ammonium Sulfide (NH$_4$)$_2$S—100° F | Ultrasonic | 57 | 24 | |
| Ammonium Polysulfide (NH$_4$)$_2$S$_x$—169° F | Rotary | 73 | 37 | 29 |
| Ammonium Polysulfide (NH$_4$)$_2$S$_x$—120° F | do | 70 | 26 | 23 |
| Ammonium Polysulfide (NH$_4$)$_2$S$_x$—75° F | do | 51 | 16 | 7 |

Higher temperatures produce higher removals of contaminating metals from the catalyst.

For treating the contaminated, finely divided, cracking catalyst, the slurry of catalyst particles and treating solution is maintained between a temperature of 100° F. and 400° F., preferably 250° F. to 350° F. and a pressure between atmospheric and about 400 p.s.i.g. and sufficient to keep the extracting solution in liquid phase. Part of the catalyst slurry is removed and allowed to settle to separate the catalyst particles from the spent ammonium polysulfide solution or the removed slurry can be centrifuged or otherwise handled to recover the catalyst. The separated catalyst is returned to the slurry system while the clear, dark-red ammonium polysulfide solution thus separated is sent to a flash drum or evaporator. In this drum or evaporator the dissolved metal impurities are precipitated and the vaporized gases are condensed and recovered to regenerate or reconstitute ammonium polysulfide solution for recycling to the slurry system. Elemental sulfur is added to the spent ammonium polysulfide to form a yellow solution and to regenerate the polysulfide.

When the centrifuged solution is no longer dark-red, the treatment with the polysulfide solution is completed and the centrifuged catalyst is then transferred to a water washing section operated at atmospheric pressure, then dried and ready for another cracking operation.

Equilibrium catalysts from commercial units differ from the experimental cracking catalyst described above in at least one important respect because they are subjected to a considerable number of regeneration cycles at temperatures in the range from 1100° F. to 1250° F. or higher, occasionally. Furthermore, the extent to which they are contaminated depends not only on the particular cracking conditions employed but also upon the nature of the feed stocks used. Thus, feed stocks (to the cracking operation) which have been prepared from South Louisiana crudes which contain only traces of vanadium will contaminate the catalysts largely with nickel and iron deposits whereas feeds from certain West Texas or Venezuela crudes which contain larger amounts of vanadium than nickel will deposit on the catalysts greater amounts of vanadium. These extreme cases as well as an intermediate one have been studied and it was found that the ease of contaminant removal varies accordingly.

| Catalyst | Feed Stock Origin | Wt. Percent of Contaminants on Catalyst | | |
|---|---|---|---|---|
| | | Vanadium | Nickel | Iron |
| A | South Louisiana | 0.007 | 0.010 | 0.199 |
| B | Mixed W. Texas and Mid Continent | 0.039 | 0.009 | 0.227 |
| C | West Texas | 0.196 | 0.029 | 0.187 |

Each of the above catalysts was treated with an aqueous ammonium polysulfide solution containing about 26% weight of ammonium polysulfide at 175° F., using 10 grams of the catalyst and 1.4 liters of the treating agent. The treating time was 30 minutes. The catalysts were regenerated silica-alumina cracking catalysts. The amount of contaminating metals removed, reported as metal, is as follows:

| Type of Catalyst Treated | Metal Removal, weight Percent | | |
|---|---|---|---|
| | Vanadium | Nickel | Iron |
| Catalyst A | 100 | 40 | 33 |
| Catalyst B | 30 | 33 | 36 |
| Catalyst C | 35 | 7 | 19 |

It is thus seen that individual contaminants are extractable to greatly varying degrees from different catalysts. The above results are by no means optimum since extraction of the most refractory catalyst, Catalyst C, by circulation of the treating agent under the same conditions of temperature over a twelve hour period did remove appreciably more metals. Thus:

| Type of Operation | Metals Removal by Ammonium Polysulfide from Catalyst C, wt. Percent | | |
|---|---|---|---|
| | Vanadium | Nickel | Iron |
| Single Stage | 35 | 7 | 19 |
| Exhaustive Extraction | 40 | 24 | 25 |

It is apparent that the commercial equilibrium cracking catalysts contain a larger proportion of unextractable metals than was the case for the experimental catalyst described previously. As already mentioned, this is due most probably to the large number of regeneration cycles to which the equilibrium catalysts are subjected in commercial operation. As a result of these many regeneration cycles, there occurs the formation of "trapped carbon" in equilibrium catalysts, that is, carbon which is not burned during the regeneration period. Some of the unextracted metals are tightly held within this "trapped carbon" as shown by the fact that, if Catalyst C is finely ground prior to regeneration, later treatment of the ground catalyst with ammonium polysulfide under the conditions given above, a somewhat greater amount of metals will be removed. Specifically, ammonium polysulfide did remove from such ground and regenerated Catalyst C about 45% of the vanadium and 24% of the nickel in a single stage operation.

It is speculated that, during these multiple regenerations, some of the metallic oxides formed do react with one another to form complex compounds which are very stable and unaffected by the treating agent. Thus, vanadium pentoxide can react (already at 900° F.) with nickel oxide to give nickel orthovanadate which is claimed to be very stable and which may, like cobalt molybdate, be insensitive to ammonium polysulfide. Also it is known that iron oxides can react with nickel oxide to give "nickel ferrites" in which the nickel has lost its "personality." Whether or not this explanation is the true mechanism involved, it has been shown in other experiments that the unextractable metals left on the cracking catalyst do not affect its cracking effectiveness and, therefore, are not objectionable.

When using a cobalt molybdate catalyst in a hydrofining process, the carbonaceous material can be burned off with air or an oxygen-containing gas after the oily material is removed with the solvent, and the catalyst then treated with ammonium sulfide or preferably ammonium polysulfide to remove metal contaminants according to the present invention. This treatment leaves the catalyst in the desired sulfurized condition for reuse in the hydrofining process without the need of passing air through the treated catalyst before using the catalyst again in the hydrofining process.

From the above data it will be apparent that with the present process a significant amount of contaminating metals can be removed from equilibrium cracking catalysts.

This application is a continuation-in-part of Retailliau application Serial No. 607,322, filed August 31, 1956, which has been abandoned.

What is claimed is:

1. A method of reactivating solid catalysts selected from the group consisting of cobalt molybdate on alumina and silica-alumina which has been contaminated with metallic deposits including vanadium, nickel, and iron in the treatment of hydrocarbons which comprises treating said catalyst with a solution selected from the group consisting of an aqueous solution of ammonium polysulfide having a concentration of ammonium polysulfide of at least 10% by weight and an aqueous solution of ammonium sulfide having a concentration of ammonium sulfide of at least about 10% by weight at a temperature between about 75° F. and 500° F. and a pressure between atmospheric and about 400 p.s.i.g. to convert contaminating metal deposits to soluble materials without removing any substantial amount of the active catalyst material, removing the solubilized material formed from said contaminating metallic deposits by washing with an aqueous medium and recovering said reactivated catalyst.

2. A method according to claim 1 wherein said catalyst is one used for hydrodesulfurizing hydrocarbons and contains cobalt molybdate and not more than about 2% of molybdenum is removed from said catalyst during treatment with the sulfide solution.

3. A method according to claim 2 wherein the cobalt molybdate is not regenerated before treatment with the sulfide solution.

4. A method according to claim 1 wherein said catalyst comprises a cracking catalyst and substantially none of the silica or alumina is removed from said catalyst.

5. A method according to claim 1 wherein said catalyst comprises a silica-alumina cracking catalyst regenerated before treatment with the sulfide solution.

6. A method according to claim 1 wherein the reactivated catalyst is then regenerated by burning off carbonaceous deposits at a temperature of about 600° to 1150° F. which were formed on said catalyst during the treatment of hydrocarbons.

7. A method of reactivating solid hydrocarbon conversion catalysts selected from the group consisting of cobalt molybdate on alumina and silica-alumina which have become contaminated with metallic deposits, selected from the group consisting of vanadium, nickel and iron, during use in treating hydrocarbons which comprises contacting the contaminated catalyst with an aqueous solution of ammonium sulfide having a concentration of ammonium sulfide in the range of about 10% by weight to a saturated solution at a temperature between about 75° and 350° F. and a pressure between about atmospheric and 400 p.s.i.g. and washing ammonium sulfide from said catalyst with an aqueous medium.

8. A method of reactivating solid hydrocarbon conversion catalysts selected from the group consisting of cobalt molybdate on alumina and silica-alumina which have become contaminated with metallic deposits, selected from the group consisting of vanadium, nickel and iron, during use in treating hydrocarbons which comprises contacting the contaminated catalyst with an aqueous solution of ammonium polysulfide having a concentration of ammonium polysulfide in the range of about 10% by weight to a saturated solution at a temperature between about 75° and 350° F. and a pressure between about atmospheric and 400 p.s.i.g. and washing ammonium polysulfide from said catalyst with an aqueous medium.

9. A method according to claim 8 wherein the reactivated catalyst is treated with air at a temperature of about 600° to 1150° F. to remove carbonaceous deposits formed during treatment of hydrocarbons.

10. A method according to claim 8 wherein said catalyst contains cobalt molybdate and said catalyst was used in the presence of hydrogen and substantially no molybdenum was removed from said catalyst during treatment with said ammonium polysulfide solution.

11. A method according to claim 10 wherein said catalyst is contacted with a solvent oil to remove oily material retained on said catalyst and then the solvent oil is removed with steam before treatment with the ammonium polysulfide solution.

12. A method according to claim 7 wherein said contaminated catalyst comprises a regenerated cracking catalyst.

13. A method of reactivating a bed of cobalt molybdate catalyst which has become contaminated with vanadium, nickel, carbon and sulfur deposits in hydrodesulfurization process for hydrocarbons which comprises passing a solvent oil through said bed of catalyst to remove oily material retained on said catalyst, steaming the catalyst bed to remove any remaining solvent oil, passing an aqueous solution of ammonium polysulfide having a concentration of ammonium polysulfide in water in the range of about 10% by weight to a saturated solution through the bed of contaminated solid catalyst at a temperature in the range of about 75° F.–500° F. and a pressure in the range of between about atmospheric and 600 p.s.i.g., removing the water-soluble complex compounds formed from said metallic contaminants by the ammonium polysulfide by washing with an aqueous medium and then passing air through the bed of catalyst at a temperature in the range of at least about 600° F. and up to about 1150° F. to remove the carbon and sulfur deposits.

14. A method of reactivating a bed of cobalt molybdate catalyst which has become contaminated with vanadium, nickel, carbon and sulfur deposits in a hydrodesulfurization process for hydrocarbons which comprises passing a solvent oil through said bed of catalyst to remove oily material retained on said catalyst, steaming the catalyst bed to remove any remaining solvent oil, passing an aqueous solution of ammonium sulfide having a concentration of ammonium sulfide in water in the range of about 10% by weight to a saturated solution through the bed of contaminated solid catalyst at a temperature in the range of about 75° F.–500° F. and a pressure in the range of about atmospheric and 600 p.s.i.g., removing the water-soluble complex compounds formed from said metallic contaminants by the ammonium sulfide by washing with an aqueous medium and then passing air through the bed of catalyst at a temperature in the range of about 600° F.–1050° F. to remove the carbon and sulfur deposits.

15. A method of reactivating a bed of cobalt molybdate catalyst which has become contaminated with carbonaceous, sulfur and metallic deposits including vanadium, nickel and iron during use in desulfurizing hydrocarbon oils in the presence of hydrogen which comprises passing a hydrogen-containing gas through the bed of catalyst at a temperature in the range of about 500–600° F. to remove the carbonaceous and sulfur deposits, passing a solvent oil selected from the group consisting of virgin gas oil and $SO_2$ extract of kerosene through said catalyst bed to remove the oily material absorbed on the catalyst, steaming the catalyst bed to remove any remaining solvent oil, passing an aqueous solution of an ammonium sulfide compound having a concentration of ammonium sulfide in water in the range of about 10% by weight to a saturated solution through the bed of contaminated solid catalyst at a temperature in the range of about 75° F.–500° F. and a pressure in the range of about atmospheric-600 p.s.i.g. and removing the water-soluble complex compounds formed from the metallic contaminants by the ammonium sulfide by washing with an aqueous medium.

16. A method of reactivating a bed of cobalt molybdate catalyst which has become contaminated with vanadium, carbon and sulfur deposits in a hydrodesulfurization process which comprises passing a solvent oil selected from the group consisting of virgin gas oil and $SO_2$ extract of kerosene through said catalyst bed to remove the oily material absorbed on the catalyst, passing water through the catalyst bed to remove any remaining solvent oil, passing an aqueous solution of ammonium sulfide compound having a concentration of ammonium sulfide in water in the range of about 10% by weight to a saturated solution through the bed of contaminated solid catalyst at a temperature in the range of about 75° F.–500° F. and a pressure in the range of about atmospheric-600 p.s.i.g., passing water through the bed of catalyst to remove the water-soluble complex compounds formed by the ammonium sulfide and passing air through the bed of catalyst at a temperature in the range of about 900° F.–1050° F. to remove the carbon and sulfur deposits.

17. A method according to claim 1 wherein said catalyst comprises a regenerated silica-alumina cracking catalyst.

18. A method according to claim 1 wherein said catalyst is a silica-alumina catalyst.

19. A method according to claim 8 wherein said catalyst comprises silica-alumina catalyst.

References Cited in the file of this patent

UNITED STATES PATENTS

| 1,538,574 | Mittasch et al. | May 19, 1925 |
| 2,204,193 | Spicer et al. | June 11, 1940 |
| 2,668,798 | Plank | Feb. 9, 1954 |

OTHER REFERENCES

Mellor: "Comprehensive Treatise on Inorganic and Theoretical Chemistry," Longmans, Green and Co., New York (1929), vol. 9, p. 734.